United States Patent
Shida et al.

(10) Patent No.: US 6,559,273 B2
(45) Date of Patent: May 6, 2003

(54) PROCESS FOR PRODUCING POLYAMIDE

(75) Inventors: Takatoshi Shida, Niigata (JP); Kazumi Tanaka, Niigata (JP)

(73) Assignee: Mitsubishi Gas Chemical Company, Ltd., Tokyo (JP)

( * ) Notice: Subject to any disclaimer, the term of this patent is extended or adjusted under 35 U.S.C. 154(b) by 0 days.

(21) Appl. No.: 09/965,222

(22) Filed: Sep. 28, 2001

(65) Prior Publication Data

US 2002/0042497 A1 Apr. 11, 2002

(30) Foreign Application Priority Data

Sep. 29, 2000 (JP) .......................................... 2000-299435

(51) Int. Cl.$^7$ ............................................... C08G 69/04
(52) U.S. Cl. ........................................ 528/310; 528/170
(58) Field of Search ................................ 528/310, 332, 528/335, 336, 170, 322, 484, 486, 492

(56) References Cited

U.S. PATENT DOCUMENTS 5,576,415 A * 11/1996 Tanaka ........................ 528/310
6,169,162 B1 * 1/2001 Bush et al. .................. 528/310
6,303,741 B1 * 10/2001 Tanaka ........................ 528/332

FOREIGN PATENT DOCUMENTS

| EP | 0071000 | * | 2/1983 |
| EP | 0084661 | * | 8/1983 |
| JP | 9-12711 | | 1/1997 |
| WO | 97/00846 | | 1/1997 |

* cited by examiner

*Primary Examiner*—P. Hampton-Hightower
(74) *Attorney, Agent, or Firm*—Antonelli, Terry, Stout & Kraus, LLP

(57) ABSTRACT

In the process of the present invention, a recovered polyamide is used as a part of the raw materials for producing polyamide. By carrying out the polycondensation under a condition such that the recovered polyamide is dissolved in the reaction system during the polycondensation, the properties of the polyamide being produced are not deteriorated as compared with those of polyamide which is produced without using the recovered polyamide. By changing the addition amount of the recovered polyamide, the crystallization speed of the resultant polyamide is controlled or increased as compared when produced without using the recovered polyamide.

38 Claims, No Drawings

PROCESS FOR PRODUCING POLYAMIDE

BACKGROUND OF THE INVENTION

1. Field of the Invention

The present invention relates to a process for producing polyamide, and more particularly to a process for producing polyamide in which industrial wastes resulting from the production process of polyamide (hereinafter occasionally referred to merely as "recovered polyamide") such as shaped articles rejected for imperfection, scraps from molding or fabricating process, and products discarded because of lack of demand, are recycled to melt polymerization process and reused as a part of raw materials.

2. Brief Description of the Prior Art

Polyamides have been extensively used in various applications such as injection-molding materials for electrical appliances, automobile parts, and computer housings; industrial or leisure filament materials for yarns, clothing such as knitted or woven fabrics, tire cords, fishing nets and fishing lines; food-packaging films; sheets for various containers; and materials for bottles, because of excellent chemical and mechanical properties such as high tenacity, high wear resistance, high fatigue resistance, good dye affinity and high gas-barrier properties. In particular, polyamides, such as polyamide MXD6, having repeating amide linkages formed from xylylenediamine and aliphatic dicarboxylic acid exhibit a high tenacity, a high Young's modulus and a low water absorption as well as excellent gas-barrier properties as compared to polyamide 6, polyamide 66, etc. Therefore, the polyamides of this type are particularly useful as various industrial materials and materials for food-packaging films, sheets and bottles.

Conventionally, polyamides have been produced from diamine and dicarboxylic acid by a so-called pressure process in which an aqueous solution of a diamine-dicarboxylic acid equimolar salt is heated under pressure, or a so-called atmospheric process in which diamine is added dropwise into molten dicarboxylic acid under a temperature rise condition. The atmospheric process is useful when the melting points of the dicarboxylic acid and the polyamide being produced are lower than the boiling point of the diamine, as in the case of producing polyamide MXD6 from m-xylylenediamine and adipic acid. The atmospheric process is superior to the pressure process because of a short reaction time, a large yield per one batch, and simplified steps and apparatuses.

In general, after completion of the polycondensation, the resultant polyamide is extruded into so-called strands through a plurality of orifices by pressurizing an interior of polymerization vessel with inert gas in a batch process, or by applying a mechanical force from a screw, etc. in a continuous process. Then, the extruded strands are cooled, solidified, and then cut into pellets. During the extrusion, if the flow of strands are disturbed by an unexpected change in the pressure condition within the polymerization vessel or in the state of the molten resin, and strands are pelletized together while contacting each other, odd-shaped pellets, e.g., chain-bonded pellets, will be produced. Since such odd-shaped pellets inhibit smooth feeding and cause malfunction of machines during injection molding process and extruding process, the odd-shaped pellets are usually removed by screening.

Since used in various applications as described above, polyamides are required to have properties, such as melt viscosity, which are suitable for a molding method according to their applications. For example, polyamides for injection molding are required to have a low melt viscosity to enhance the fluidity in a mold. Polyamides for extrusion are required to have a high melt viscosity because an adequate melt strength is required during the extrusion process. When a plurality of resins are used in combination to produce polymer alloys, polymer blends or multi-layer sheets or films, the respective resins are occasionally required to have different melt viscosities depending upon their compatibility, mixing ratios or amounts used. For this reason, material makers must usually supply several grade of polymers having different melt viscosities to meet the market's demand. However, some grades become in surplus because of change in the market's demand and demanded amounts.

Hitherto, polyamides recovered as the rejected products, surplus products and scraps have been merely discarded as industrial wastes, making the production process less profitable because of additional costs required for the disposal and transportation. In addition, it is required to minimize the industrial wastes in view of recently increasing demand for protecting the environment. Further, for the purpose of increasing the yield, the recycling and reuse of the recovered polyamide have been required.

The recovered polyamide from the industrial polyamide production are usually recycled and reused by re-melting in an extruder, etc., and then re-granulating. This method is costly advantageous, but the reclaimed polyamide are poor in quality such as color tone, and cannot be used equally to the products before re-melting.

Also, there is known a so-called thermal recycle method in which wastes are recovered in the form of heat. However, this is a method to be finally selected when wastes are not suitable for reclaiming.

In addition, there is also known a so-called chemical recycle method in which waste polymers are decomposed into reusable monomers. This method has been now most prevailing, and studied and researched by many material makers. For example, WO97/00846 discloses a process for recovering diamine and dicarboxylic acid from polyamides. In this process, the polyamides are hydrolyzed by adding nitric acid to recover monomers. This process, however, requires a special apparatus as well as large apparatus and maintenance costs to avoid the corrosion of the apparatus due to the use of nitric acid as a strong acid.

Japanese Patent Application Laid-Open No. 9-12711 discloses a process for producing polyamide in which odd-shaped pellets are made into a slurry in a liquid medium such as water, and then mixed with raw materials. This process is cost-advantageous since substantially no change is required in the apparatus, but, disadvantageous in view of saving energy because a large amount of the liquid medium such as water is used.

Under these circumstances, it has been strongly required to develop a process for recycling the recovered polyamide, which is capable of producing a polyamide having a quality not deteriorated as compared when produced without using the recovered polyamide, with minimum cost for additional apparatus and without any significant change in the production process.

As described above, the polyamide for injection molding is required to have a low melt viscosity to ensure a good fluidity in a mold. In addition, the polyamide is required to have a high crystallization speed to shorten the molding cycle. In general, the crystallization speed of polyamide is increased by adding various inorganic materials or polymers having a high crystallization speed and a good compatibility with the polyamide. However, since the amount of addition is limited because of deterioration in properties, the crystallization speed can be increased only to a limited extent. Therefore, to further increase the crystallization speed, it is necessary to increase the crystallization speed of the polyamide itself. Thus, it has also been strongly required to develop a method for increasing the crystallization speed of the polyamide itself.

SUMMARY OF THE INVENTION

An object of the present invention is to provide a method for producing a polyamide by reusing a recovered polyamide, which has been conventionally disposed as wastes, as a part of raw materials, the process being capable of producing the polyamide without causing deterioration of quality at minimum costs for additional apparatus without needing the change of the production process. Another object is to provide a method for increasing the crystallization speed of a polyamide which is produced from a raw material containing the recovered polyamide.

As a result of extensive researches, the inventors have found that the above object is achieved by a melt polycondensation comprising a step of adding a diamine to a molten dicarboxylic acid, wherein a predetermined amount of a recovered polyamide is added to the melt polycondensation system and dissolved therein during the melt polycondensation. The inventors have further found that the crystallization speed of the resultant polyamide can be increased by controlling the amount of the recovered polyamide to be added. The present invention has been accomplished on the basis of these findings.

Thus, the present invention provides a process for producing polyamide by a melt polycondensation comprising a step of adding a diamine to a molten dicarboxylic acid, wherein a recovered polyamide is added to the melt polycondensation system and dissolved in the melt polycondensation system during the melt polycondensation.

The present invention further provides a polyamide having a controlled crystallization speed produced by the above method.

DETAILED DESCRIPTION OF THE INVENTION

The recovered polyamide used in the present invention and the polyamide produced by the present invention are not particularly restricted as long as the polyamides are produced from a diamine and a dicarboxylic acid. The process of the present invention is directed to the so-called atmospheric process in which a diamine is added to a molten dicarboxylic acid under temperature rise condition. Therefore, the melting points of the dicarboxylic acid and the polyamide being produced are preferably lower than the boiling point of the diamine. The preferred combination of the diamine and the dicarboxylic acid include, for example, xylylenediamine or bisaminocyclohexane and adipic acid, particularly m-xylylenediamine or 1,3-bisaminocyclohexane and adipic acid.

In the process of the present invention, the recovered polyamide added to the melt polycondensation system should be dissolved in the system before the completion of the melt polycondensation. If the recovered polyamide fails to completely dissolve into the system during the melt polycondensation, the quality of the polyamide being produced varies, or the resultant polyamide may cause troubles such as clogging of a discharge tube during the recovery of the product. The timing for adding the recovered polyamide is not specifically limited as far as the recovered polyamide is dissolved in the system before the completion of the polycondensation. Preferably, the recovered polyamide is added to the molten dicarboxylic acid before adding the diamine in order to prevent the polyamide being produced from subjecting to a high heat history because of elongated time period of dissolving the recovered polyamide and elongated reaction time of polycondensation.

The rejected products, scraps and surplus products may be used singly or in combination of two or more as the recovered polyamide. The amount of the recovered polyamide to be added is less than 30% by weight based on the weight of the polyamide being produced. When the amount is 30% by weight or more, the recovered polyamide fails to be completely dissolved in the system during the melt polycondensation, or takes a prolonged period of time until dissolved in the system. In addition, the polymerization reaction liquid becomes viscous, thereby inhibiting the main polycondensation reaction. This elongates the reaction time of polycondensation required for achieving desired properties of the polyamide. Therefore, the polyamide being produced is subjected to heat history longer than usual, resulting in the deterioration of quality.

The amount of the recovered polyamide to be added may be varied according to the requirements. For example, when the properties of the polyamide being produced are not desired to be affected by the addition of the recovered polyamide, the recovered polyamide is added in an amount of less than 3% by weight based on the weight of the polyamide being produced. To increase the crystallization speed of the polyamide being produced, the recovered polyamide is added in an amount of from 3% by weight to less than 30% by weight, preferably from 4 to 20% by weight based on the weight of the polyamide being produced.

The recovered polyamide added to the molten dicarboxylic acid may be hydrolyzed with a small amount of water in the system excessively containing the dicarboxylic acid. The water content of the molten dicarboxylic acid is preferably 10% by weight or lower. When the water content exceeds 10% by weight, the main polycondensation reaction is inhibited, so that the reaction time required for achieving desired properties of the polyamide becomes longer than usual. Therefore, the polyamide being produced is subjected to heat history longer, resulting in the deterioration of quality thereof.

The recovered polyamide is preferred to be dissolved into the reaction system as immediately as possible. To ensure the immediate dissolution, the recovered polyamide is added preferably in the form of granular or powder. The number-average molecular weight of the recovered polyamide is preferably 80,000 or less, more preferably 65,000 or less. The crystallinity thereof is preferably 50% or less, more preferably 40% or less. When the number-average molecular weight exceeds 80,000 or the crystallinity exceeds 50%, the recovered polyamide may fail to be completely dissolved during the polycondensation even though the amount added is within the above-specified range, or an excessive period of time is required until the recovered polyamide is dissolved into the reaction system. As a result, the polymerization reaction liquid becomes viscous to deteriorate the quality of the polyamide being produced. A polyamide having an increased crystallization speed is intended, the number-average molecular weight of the recovered polyamide is preferably in the range of 10,000 to 50,000.

In the process of the present invention, if required, may be used inorganic or organic compounds such as lubricants, anticoloring agents, cross-linking inhibitors, light-resistance improvers, pigments, antistatic agents and flame retardants. These compounds may be added to the reaction system at any stage of the reaction, but preferably added together with the recovered polyamide.

The present invention will be described in more detail by reference to the following examples. In Tables, "N-MXD6" represents poly(m-xylyleneadipamide) added as the recovered polyamide, and "Mn" represents a number-average molecular weight. Properties were evaluated by the following methods.

(1) Water Content (% by Weight)

Two grams of pellet was treated under a vaporizing condition of 30 minutes at the melting point to determine the water content of the pellet using a Karl Fisher titrator (model CA-05) and a vaporizer (model VA-05) both produced by Mitsubishi Chemical Corporation.

(2) Number-Average Molecular Weight (Mn)

The number-average molecular weight was calculated from the measured values of a terminal amino concentration and a terminal carboxyl concentration according to the following formula:

$$Mn=2/([NH_2]+[COOH])$$

wherein $[NH_2]$ is the terminal amino concentration (equivalent/g) and $[COOH]$ is the terminal carboxyl concentration (equivalent/g).

(3) Crystallization Speed

The crystallization speed of polyamide was evaluated by a half-crystallization time. The half-crystallization time represents a period of time required until the crystallization proceeds by half when a crystallizable material changes from a molten state to a crystalline state. The shorter the half-crystallization time, the higher the crystallization speed. The half-crystallization time was measured by a crystallization speed measuring device "MK-801 Model" manufactured by Kotaki Seisakusho Co., Ltd. After preheating a polyamide at 260° C. for 3 minutes, the polyamide was immersed in an oil bath maintained at a predetermined temperature to measure a polarization compensation voltage with the passage of time. The time required until the voltage reached half of the constant voltage was employed as the half crystallization time.

EXAMPLE 1

Into a 2-L separable flask equipped with a stirrer, a partial condenser, a thermometer, a dropping funnel and a nitrogen inlet, was accurately weighed 600.00 g of adipic acid, and then the flask was sufficiently purged with nitrogen. The adipic acid was heated to 190° C. under a small amount of nitrogen stream and uniformly melted. Then, 14.55 g of poly(m-xylyleneadipamide) having a number-average molecular weight of 16,000 (2.8% by weight based on the polymer being produced) was added to the molten adipic acid, and the mixture was stirred for 20 min. Thereafter, 562.00 g of m-xylylenediamine was added to the mixture dropwise over 120 min under stirring. During the dropwise addition, the reaction temperature was continuously raised up to 250° C., and a condensation water generated during the addition of the diamine was removed from the reaction system through the partial condenser and a complete condenser. After completion of adding the diamine, the reaction was continued for 60 min while maintaining the reaction liquid at 258° C. Properties of the resultant polyamide are shown in Table 1.

EXAMPLE 2

Into a 2-L separable flask equipped with a stirrer, a partial condenser, a thermometer, a dropping funnel and a nitrogen inlet, was accurately weighed 600.00 g of adipic acid, and then the flask was sufficiently purged with nitrogen. The adipic acid was heated to 190° C. under a small amount of nitrogen stream and uniformly melted. Then, 14.55 g of poly(m-xylyleneadipamide) having a number-average molecular weight of 40,000 (2.8% by weight based on the polymer being produced) was added to the molten adipic acid, and the mixture was stirred for 20 min. Thereafter, 562.00 g of m-xylylenediamine was added to the mixture dropwise over 120 min under stirring. During the dropwise addition, the reaction temperature was continuously raised up to 250° C., and a condensation water generated during the addition of the diamine was removed from the reaction system through the partial condenser and a complete condenser. After completion of adding the diamine, the reaction was continued for 60 min while maintaining the reaction liquid at 258° C. Properties of the resultant polyamide are shown in Table 1.

EXAMPLE 3

Into a 2-L separable flask equipped with a stirrer, a partial condenser, a thermometer, a dropping funnel and a nitrogen inlet, was accurately weighed 600.00 g of adipic acid, and then the flask was sufficiently purged with nitrogen. The adipic acid was heated to 190° C. under a small amount of nitrogen stream and uniformly melted. Then, 14.75 g of poly(m-xylyleneadipamide) having a number-average molecular weight of 16,000 (2.8% by weight based on the polymer being produced) was added to the molten adipic acid, and the mixture was stirred for 20 min. Thereafter, 578.51 g of 1,3-bisaminocyclohexane was added to the mixture dropwise over 120 min under stirring. During the dropwise addition, the reaction temperature was continuously raised up to 244° C., and a condensation water generated during the addition of the diamine was removed from the reaction system through the partial condenser and a complete condenser. After completion of adding the diamine, the reaction was continued for 60 min while maintaining the reaction liquid at 250° C. Properties of the resultant polyamide are shown in Table 3.

EXAMPLE 4

Into a 2-L separable flask equipped with a stirrer, a partial condenser, a thermometer, a dropping funnel and a nitrogen inlet, was accurately weighed 600.00 g of adipic acid, and then the flask was sufficiently purged with nitrogen. The adipic acid was heated to 190° C. under a small amount of nitrogen stream and uniformly melted. Then, 58.20 g of poly(m-xylyleneadipamide) having a number-average molecular weight of 16,000 (5.4% by weight based on the polymer being produced) was added to the molten adipic acid, and the mixture was stirred for 20 min. Thereafter, 562.00 g of m-xylylenediamine was added to the mixture dropwise over 120 min under stirring. During the dropwise addition, the reaction temperature was continuously raised up to 250° C., and a condensation water generated during the addition of the diamine was removed from the reaction system through the partial condenser and a complete condenser. After completion of adding the diamine, the reaction was continued for 60 min while maintaining the reaction liquid at 258° C. Properties of the resultant polyamide are shown in Table 1.

EXAMPLE 5

Into a 2-L separable flask equipped with a stirrer, a partial condenser, a thermometer, a dropping funnel and a nitrogen inlet, was accurately weighed 600.00 g of adipic acid, and then the flask was sufficiently purged with nitrogen. The adipic acid was heated to 190° C. under a small amount of nitrogen stream and uniformly melted. Then, 59.00 g of poly(m-xylyleneadipamide) having a number-average molecular weight of 16,000 (5.4% by weight based on the polymer being produced) was added to the molten adipic acid, and the mixture was stirred for 20 min. Thereafter, 578.51 g of 1,3-bisaminocyclohexane was added to the mixture dropwise over 120 min under stirring. During the dropwise addition, the reaction temperature was continuously raised up to 244° C., and a condensation water generated during the addition of the diamine was removed from the reaction system through the partial condenser and a complete condenser. After completion of adding the diamine, the reaction was continued for 60 min while maintaining the reaction liquid at 250° C. Properties of the resultant polyamide are shown in Table 3.

EXAMPLE 6

Into a 2-L separable flask equipped with a stirrer, a partial condenser, a thermometer, a dropping funnel and a nitrogen inlet, was accurately weighed 600.00 g of adipic acid, and then the flask was sufficiently purged with nitrogen. The adipic acid was heated to 190° C. under a small amount of nitrogen stream and uniformly melted. Then, 116.60 g of poly(m-xylyleneadipamide) having a number-average molecular weight of 16,000 (10% by weight based on the polymer being produced) was added to the molten adipic acid, and the mixture was stirred for 20 min. Thereafter, 562.00 g of m-xylylenediamine was added to the mixture dropwise over 120 min under stirring. During the dropwise addition, the reaction temperature was continuously raised up to 250° C., and a condensation water generated during the addition of the diamine was removed from the reaction system through the partial condenser and a complete condenser. After completion of adding the diamine, the reaction was continued for 60 min while maintaining the reaction liquid at 258° C. Properties of the resultant polyamide are shown in Table 2.

EXAMPLE 7

Into a 2-L separable flask equipped with a stirrer, a partial condenser, a thermometer, a dropping funnel and a nitrogen inlet, were accurately weighed 600.00 g of adipic acid and 233.30 g of poly(m-xylyleneadipamide) having a number-average molecular weight of 16,000 (18% by weight based on the polymer being produced), and then the flask was sufficiently purged with nitrogen. The mixture was heated to 190° C. under a small amount of nitrogen stream and uniformly melted. Thereafter, 562.00 g of m-xylylenediamine was added to the mixture dropwise over 120 min under stirring. During the dropwise addition, the reaction temperature was continuously raised up to 250° C., and a condensation water generated during the addition of the diamine was removed from the reaction system through the partial condenser and a complete condenser. After completion of adding the diamine, the reaction was continued for 60 min while maintaining the reaction liquid at 258° C. Properties of the resultant polyamide are shown in Table 2.

REFERENCE EXAMPLE 1

Into a 2-L separable flask equipped with a stirrer, a partial condenser, a thermometer, a dropping funnel and a nitrogen inlet, was accurately weighed 600.00 g of adipic acid, and then the flask was sufficiently purged with nitrogen. The adipic acid was heated to 190° C. under a small amount of nitrogen stream and uniformly melted, and stirred for 20 min. Thereafter, 562.00 g of m-xylylenediamine was added to the molten adipic acid dropwise over 120 min under stirring. During the dropwise addition, the reaction temperature was continuously raised up to 250° C., and a condensation water generated during the addition of the diamine was removed from the reaction system through the partial condenser and a complete condenser. After completion of adding the diamine, the reaction was continued for 60 min while maintaining the reaction liquid at 258° C. Properties of the resultant polyamide are shown in Table 2.

REFERENCE EXAMPLE 2

Into a 2-L separable flask equipped with a stirrer, a partial condenser, a thermometer, a dropping funnel and a nitrogen inlet, was accurately weighed 600.00 g of adipic acid, and then the flask was sufficiently purged with nitrogen. The adipic acid was heated to 190° C. under a small amount of nitrogen stream and uniformly melted, and stirred for 20 min. Thereafter, 578.51 g of 1,3-bisaminocyclohexane was added to the molten adipic acid dropwise over 120 min under stirring. During the dropwise addition, the reaction temperature was continuously raised up to 244° C., and a condensation water generated during the addition of the diamine was removed from the reaction system through the partial condenser and a complete condenser. After completion of adding the diamine, the reaction was continued for 60 min while maintaining the reaction liquid at 250° C. Properties of the resultant polyamide are shown in Table 3.

COMPARATIVE EXAMPLE 1

Into a 2-L separable flask equipped with a stirrer, a partial condenser, a thermometer, a dropping funnel and a nitrogen inlet, were accurately weighed 600.00 g of adipic acid and 441.00 g of poly(m-xylyleneadipamide) having a number-average molecular weight of 16,000 (30% by weight based on the polymer being produced), and then the flask was sufficiently purged with nitrogen. The mixture was heated to 190° C. under a small amount of nitrogen stream. However, the poly(m-xylyleneadipamide) was not completely dissolved in the molten adipic acid even after continuous stirring for 360 min. Thereafter, 562.00 g of m-xylylenediamine was added to the heterogeneous liquid dropwise over 120 min under stirring. During the dropwise addition, the reaction temperature was continuously raised up to 250° C., and a condensation water generated during the addition of the diamine was removed from the reaction system through the partial condenser and a complete condenser. Even after the addition of the diamine was completed, the poly(m-xylyleneadipamide) was not completely dissolved in the reaction system. Since undesired results and troubles such as uneven quality of the polyamide throughout the batch and clogging of outlets in the granulation step were anticipated, the subsequent reaction and evaluation were not carried out.

COMPARATIVE EXAMPLE 2

Into a 2-L separable flask equipped with a stirrer, a partial condenser, a thermometer, a dropping funnel and a nitrogen inlet, were accurately weighed 600.00 g of adipic acid and 441.00 g of poly(m-xylyleneadipamide) having a number-average molecular weight of 40,000 (30% by weight based on the polymer being produced), and then the flask was sufficiently purged with nitrogen. The mixture was heated to 190° C. under a small amount of nitrogen stream. However, the poly(m-xylyleneadipamide) was not completely dissolved in the molten adipic acid even after continuous stirring for 360 min. Thereafter, 562.00 g of m-xylylenediamine was added to the heterogeneous liquid dropwise over 120 min under stirring. During the dropwise addition, the reaction temperature was continuously raised up to 250° C., and a condensation water generated during the addition of the diamine was removed from the reaction system through the partial condenser and a complete condenser. Even after the addition of the diamine was completed, the poly(m-xylyleneadipamide) was not completely dissolved in the reaction system. Since undesired results and troubles such as uneven quality of the polyamide throughout the batch and clogging of outlets in the granulation step were anticipated, the subsequent reaction and evaluation were not carried out.

COMPARATIVE EXAMPLE 3

Into a 2-L separable flask equipped with a stirrer, a partial condenser, a thermometer, a dropping funnel and a nitrogen inlet, were accurately weighed 600.00 g of adipic acid 446.00 g of poly(m-xylyleneadipamide) having a number-average molecular weight of 16,000 (30% by weight based on the polymer being produced), and then the flask was sufficiently purged with nitrogen. The mixture was heated to 190° C. under a small amount of nitrogen stream. However, the poly(m-xylyleneadipamide) was not completely dissolved in the molten adipic acid even after continuous stirring for 360 min. Thereafter, 578.51 g of 1,3-bisaminocyclohexane was added to the heterogeneous liquid dropwise over 120 min under stirring. During the dropwise addition, the reaction temperature was continuously raised up to 244° C., and a condensation water generated during the addition of the diamine was removed from the reaction system through the partial condenser and a complete condenser. Even after the addition of the diamine was completed, the poly(m-xylyleneadipamide) was not completely dissolved in the reaction system. Since undesired results and troubles such as uneven quality of the polyamide throughout the batch and clogging of outlets in the granulation step were anticipated, the subsequent reaction and evaluation were not carried out.

TABLE 1

|  | Examples | | |
|---|---|---|---|
|  | 1 | 2 | 4 |
| Adipic acid (g) | 600.00 | 600.00 | 600.00 |
| m-Xylylenediamine (g) | 562.00 | 562.00 | 562.00 |
| N-MXD6 |  |  |  |
| Mn | 16,000 | 40,000 | 16,000 |
| Addition amount (% by weight) | 2.8 | 2.8 | 5.4 |
| Properties of polyamide |  |  |  |
| Water content (%) | 0.40 | 0.39 | 0.37 |
| Mn | 17,100 | 16,900 | 16,800 |
| Half-crystallization time |  |  |  |
| at 120° C. (sec) | 830 | 830 | 760 |
| at 160° C. (sec) | 38 | 38 | 36 |

TABLE 2

|  | Examples | | Reference Example |
|---|---|---|---|
|  | 6 | 7 | 1 |
| Adipic acid (g) | 600.00 | 600.00 | 600.00 |
| m-Xylylenediamine (g) | 562.00 | 562.00 | 562.00 |
| N-MXD6 |  |  |  |
| Mn | 16,000 | 16,000 | — |
| Addition amount (% by weight) | 10 | 18 | — |
| Properties of polyamide |  |  |  |
| Water content (%) | 0.38 | 0.38 | 0.45 |
| Mn | 17,000 | 16,700 | 17,200 |
| Half-crystallization time |  |  |  |
| at 120° C. (sec) | 650 | 800 | 830 |
| at 160° C. (sec) | 33 | 37 | 38 |

TABLE 3

|  | Examples | | Reference Example |
|---|---|---|---|
|  | 3 | 5 | 2 |
| Adipic acid (g) | 600.00 | 600.00 | 600.00 |
| 1,3-Bisaminocyclohexane (g) | 578.51 | 578.51 | 578.51 |
| N-MXD6 |  |  |  |
| Mn | 16,000 | 16,000 | — |
| Addition amount (% by weight) | 2.8 | 5.4 | — |
| Properties of polyamide |  |  |  |
| Water content (%) | 0.45 | 0.45 | 0.45 |
| Mn | 13,200 | 13,300 | 13,200 |
| Half-crystallization time |  |  |  |
| at 160° C. (sec) | 1200 | 1100 | 1200 |
| at 170° C. (sec) | 700 | 640 | 700 |

As seen from Tables 1 to 3, it was confirmed that:
(1) the polyamides obtained in Examples 1 and 2 had a crystallization speed substantially equal to that of the polyamide of Reference Example 1 produced by adding no N-MXD6;
(2) the polyamide obtained in Example 3 had a crystallization speed substantially equal to that of the polyamide of Reference Example 2 produced by adding no N-MXD6;
(3) the polyamides obtained in Examples 4, 6 and 7 had a crystallization speed larger than that of the polyamide of Reference Example 1 produced by adding no N-MXD6; and
(4) the polyamide obtained in Example 5 had a crystallization speed larger than that of the polyamide of Reference Example 2 produced by adding no N-MXD6.

As described above, in Comparative Examples 1, 2 and 3, the recovered polyamide added was not completely dissolved in the reaction system during the polycondensation, thereby failing to produce polyamide suitable for practical use.

In accordance with the present invention, industrial wastes such as molded articles rejected by defective shapes resulting from polyamide production are reused as a part of raw materials for producing polyamide which is not deteriorated in its quality by the reuse of the recovered polyamide. The crystallization speed of the polyamide being produced is controlled by changing the addition amount of the recovered polyamide.

What is claimed is:

1. A process for producing polyamide by melt polycondensing comprising a step of adding a diamine to a molten dicarboxylic acid, wherein a recovered polyamide is added to a melt polycondensation system, and dissolved in the melt polycondensation system during the melt polycondensation, wherein the molten dicarboxylic acid contains water in an amount of 10% by weight or less.

2. The process according to claim 1, wherein the recovered polyamide is added to the melt polycondensation system in an amount of less than 30% by weight based on the weight of a polyamide being produced.

3. The process according to claim 1, wherein the recovered polyamide is added to the melt polycondensation system in an amount of less than 3% by weight based on the weight of a polyamide being produced, thereby avoiding the change of properties of a polyamide being produced.

4. The process according to claim 1, wherein the recovered polyamide is added to the melt polycondensation system in an amount from 3% to less than 30% by weight based on the weight of a polyamide being produced, thereby controlling a crystallization speed of a polyamide being produced.

5. The process according to claim 1, wherein the recovered polyamide is added to the melt polycondensation system in an amount from 3% to less than 30% by weight based on the weight of a polyamide being produced, thereby increasing a crystallization speed of a polyamide being produced.

6. The process according to claim 1, wherein the diamine is xylylenediamine.

7. The process according to claim 6, wherein the xylylenediamine is m-xylylenediamine.

8. The process according to claim 1, wherein the diamine is bisaminocyclohexane.

9. The process according to claim 8, wherein the bisaminocyclohexane is 1,3-bisaminocyclohexane.

10. The process according to claim 1, wherein the dicarboxylic acid is adipic acid.

11. The process according to claim 1, wherein the recovered polyamide is added in the form of granular or powder.

12. The process according to claim 1, wherein the recovered polyamide has a number-average molecular weight of 80,000 or less.

13. The process according to claim 1, wherein the recovered polyamide has a crystallinity of 50% or less.

14. A polyamide having a controlled crystallization speed, which is produced by the process according to claim 4.

15. The polyamide according to claim 14, wherein the diamine is xylylenediamine.

16. The polyamide according to claim 15, wherein the xylylenediamine is m-xylylenediamine.

17. The polyamide according to claim 14, wherein the diamine is bisaminocyclohexane.

18. The polyamide according to claim 17, wherein the bisaminocyclohexane is 1,3-bisaminocyclohexane.

19. The polyamide according to claim 14, wherein the dicarboxylic acid is adipic acid.

20. The polyamide according to claim 14, wherein the recovered polyamide is added in the form of granular or powder.

21. The polyamide according to claim 14, wherein the recovered polyamide has a number-average molecular weight of 80,000 or less.

22. The polyamide according to claim 14, wherein the recovered polyamide has a crystallinity of 50% or less.

23. A polyamide having an increased crystallization speed, which is produced by the process according to claim 5.

24. The polyamide according to claim 23, wherein the diamine is xylylenediamine.

25. The polyamide according to claim 24, wherein the xylylenediamine is m-xylylenediamine.

26. The polyamide according to claim 23, wherein the diamine is bisaminocyclohexane.

27. The polyamide according to claim 26, wherein the bisaminocyclohexane is 1,3-bisaminocyclohexane.

28. The polyamide according to claim 23, wherein the dicarboxylic acid is adipic acid.

29. The polyamide according to claim 23, wherein the recovered polyamide is added in the form of granular or powder.

30. The polyamide according to claim 23, wherein the recovered polyamide has a number-average molecular weight of 80,000 or less.

31. The polyamide according to claim 23, wherein the recovered polyamide has a crystallinity of 50% or less.

32. A process according to claim 1, wherein the recovered polyamide is dissolved in the melt polycondensation system prior to completion of the melt polycondensation.

33. A process for producing polyamide by melt polycondensing comprising a step of adding a diamine to a molten dicarboxylic acid, and conducting melt polycondensation, wherein a recovered polyamide is added to a melt polycondensation system, and dissolved in the melt polycondensation system during the melt polycondensation.

34. The process according to claim 33, wherein the molten dicarboxylic acid contains water in an amount of 10% by weight or less.

35. The process according to claim 33, wherein the recovered polyamide is added in the form of granular or powder.

36. The process according to claim 33, wherein the recovered polyamide is added to the melt polycondensation system in an amount from 3% to less than 30% by weight based on the weight of a polyamide being produced, thereby controlling a crystallization speed of a polyamide being produced.

37. A polyamide having a controlled crystallization speed, which is produced by the process according to claim 36.

38. A polyamide produced by the process of claim 33.

* * * * *